US011130573B2

(12) United States Patent
Holly et al.

(10) Patent No.: US 11,130,573 B2
(45) Date of Patent: Sep. 28, 2021

(54) DISBURSEMENT SYSTEM FOR AN UNMANNED AERIAL VEHICLE

(71) Applicant: PULSE AEROSPACE LLC, Lawrence, KS (US)

(72) Inventors: Lance Holly, Lawrence, KS (US); William Donovan, Lawrence, KS (US); Aaron Lessig, Lawrence, KS (US)

(73) Assignee: AEROVIRONMENT, INC., Simi Valley, CA (US)

(*) Notice: Subject to any disclaimer, the term of this patent is extended or adjusted under 35 U.S.C. 154(b) by 577 days.

(21) Appl. No.: 15/773,074

(22) PCT Filed: Nov. 2, 2016

(86) PCT No.: PCT/US2016/060172
§ 371 (c)(1),
(2) Date: May 2, 2018

(87) PCT Pub. No.: WO2017/079340
PCT Pub. Date: May 11, 2017

(65) Prior Publication Data

US 2018/0319499 A1 Nov. 8, 2018

Related U.S. Application Data

(60) Provisional application No. 62/285,023, filed on Nov. 2, 2015.

(51) Int. Cl.
*B64D 1/18* (2006.01)
*B64C 39/02* (2006.01)
(Continued)

(52) U.S. Cl.
CPC .................. *B64D 1/18* (2013.01); *B05B 1/20* (2013.01); *B64C 39/024* (2013.01);
(Continued)

(58) Field of Classification Search
CPC ...... B64D 1/18; B64C 2201/12; A01B 79/005
See application file for complete search history.

(56) References Cited

U.S. PATENT DOCUMENTS

| | | |
|---|---|---|
| 4,948,050 A | 8/1990 | Picot |
| 5,653,389 A | 8/1997 | Henderson et al. |

(Continued)

FOREIGN PATENT DOCUMENTS

| | | | |
|---|---|---|---|
| CN | 102591302 A | 7/2012 | |
| CN | 102687711 A | 9/2012 | |

(Continued)

OTHER PUBLICATIONS

International Search Report and Written Opinion of the International Searching Authority for International Application No. PCT/US2016/060172, dated Feb. 27, 2017 (11 pages).

(Continued)

*Primary Examiner* — Philip J Bonzell
*Assistant Examiner* — Michael B. Kreiner
(74) *Attorney, Agent, or Firm* — Dorsey & Whitney LLP

(57) ABSTRACT

A disbursement system for a UAV is provided. The disbursement system may include a plurality of disbursement nozzles operable to dispense an agricultural product at variable flowrates, a flow controller responsive to instructions and operable to regulate a volume of the agricultural product dispensed by the disbursement nozzles, and a control system. The control system may include a plurality of sensors operable to monitor a plurality of flight parameters and a processing unit configured to model an effect of the plurality of flight parameters on first flow control instructions corresponding to a prescription coverage of the agricultural product and calculate and output modulated flow control instructions to the flow controller. The control system may modulate the first control instructions to change a
(Continued)

flowrate of one or more of the plurality of disbursement nozzles to achieve an actual coverage of the agricultural product that is closer to the prescription coverage.

20 Claims, 7 Drawing Sheets

(51) Int. Cl.
*B05B 1/20* (2006.01)
*G05D 7/06* (2006.01)
(52) U.S. Cl.
CPC ...... *G05D 7/0617* (2013.01); *B64C 2201/024* (2013.01); *B64C 2201/12* (2013.01)

(56) References Cited

U.S. PATENT DOCUMENTS

| | | | | |
|---|---|---|---|---|
| 5,716,032 | A | 2/1998 | Mcingvale | |
| 6,087,984 | A * | 7/2000 | Keller | A01B 79/005 342/357.31 |
| 7,640,797 | B2 * | 1/2010 | Smith | B64D 1/18 73/170.02 |
| 9,110,011 | B2 * | 8/2015 | Zhao | G01N 21/3504 |
| 9,173,337 | B2 * | 11/2015 | Guyette | G05D 1/0202 |
| 9,382,003 | B2 * | 7/2016 | Burema | B64C 39/024 |
| 9,428,272 | B2 * | 8/2016 | Markov | B64C 39/024 |
| 9,884,330 | B2 * | 2/2018 | Humpal | A01B 79/005 |
| 10,266,265 | B2 * | 4/2019 | Wu | B05B 13/005 |
| 10,303,164 | B2 * | 5/2019 | Haruta | B64D 1/18 |
| 10,400,758 | B2 * | 9/2019 | Bei | F04B 49/065 |
| 10,772,253 | B2 * | 9/2020 | Calleija | A01M 21/043 |
| 2013/0068892 | A1 * | 3/2013 | Bin Desa | B64C 39/024 244/190 |
| 2014/0303814 | A1 | 10/2014 | Burema et al. | |

FOREIGN PATENT DOCUMENTS

| | | | |
|---|---|---|---|
| CN | 103777652 | A | 5/2014 |
| CN | 104554725 | A | 4/2015 |
| DE | 202014002338 | U1 | 5/2014 |
| JP | H0398668 | A | 4/1991 |
| JP | H08239099 | A | 9/1996 |
| JP | H10113589 | A | 5/1998 |
| JP | 2002211494 | A | 7/2002 |
| JP | 2004305805 | A | 11/2004 |
| JP | 2005245372 | A | 9/2005 |
| JP | 2006001485 | A | 1/2006 |
| JP | 2007030544 | A | 2/2007 |
| JP | 2014113864 | A | 6/2014 |
| WO | 2005123503 | A1 | 12/2005 |
| WO | 2011152702 | A1 | 12/2011 |
| WO | 2013061563 | A1 | 5/2013 |

OTHER PUBLICATIONS

JPO, "Non-Final Office Action", Application No. 2018-543029, dated May 14, 2019, 11 pages.
"Extended European Search Report dated Aug. 7, 2020", for European Application No. 20161610, 9 pages.
NIPA, "CN: NFOA & Search Report", App. No. 2016800757358, dated Nov. 3, 2020, 16 pages.
JPO, "NFOA", App. No. 2019-226886, dated Dec. 23, 2020, 5 pages.

* cited by examiner

DISBURSEMENT SYSTEM FOR AN UNMANNED AERIAL VEHICLE

CROSS REFERENCE TO RELATED APPLICATIONS

This application claims the benefit of priority of U.S. provisional application No. 62/285,023 filed 2 Nov. 2015 entitled "Disbursement system for an unmanned aerial vehicle," which is hereby incorporated herein by reference in its entirety for the purposes of PCT Rule 20.6.

TECHNICAL FIELD

This disclosure relates generally to disbursement systems and, more specifically, to fluid or particulate disbursement systems for an unmanned aerial vehicle.

BACKGROUND

Fluid or particulate disbursement systems, such as those provided by an unmanned aerial vehicle ("UAV") (e.g., a helicopter), use flow control systems to disburse an agricultural chemical or product over a defined space. For example, aerial application of chemicals or product (e.g., fertilizers, weed killers, fire retardant, etc.) from a UAV is typically provided by a pump and a valve assembly that can be modulated as to the amount of chemical being dispersed. Disbursing agricultural products aerially, however, is prone to inconsistent coverage due, at least in part, to fluctuations in wind speed and in the altitude and velocity of the UAV. For example, variation in spray uniformity may be present due to non-uniform vehicle movements during the acceleration, cruising, and deceleration phases of each spray pass. Furthermore, common perturbations such as rolling, pitching, and yawing, or forward, vertical, and lateral accelerations of the UAV can contribute to non-uniformity in distribution without an accounting for these motions.

It is therefore desirable to provide an improved disbursement system and, more specifically, an improved disbursement system for a UAV that addresses the above mentioned problems and/or which more generally offers improvements or an alternative to existing arrangements.

The information included in this Background section of the specification, including any references cited herein and any description or discussion thereof, is included for technical reference purposes only and is not to be regarded subject matter by which the scope of the invention as defined in the claims is to be bound.

BRIEF SUMMARY

The present disclosure generally provides a disbursement system for a UAV. In one embodiment, the disbursement system may include a product reservoir, a pump system, a plurality of disbursement nozzles operable to dispense a chemical or product (e.g., an agricultural product) at a flowrate, and a control system to modulate the flowrate. The control system may include a plurality of sensors operable to monitor a plurality of flight parameters and a processing unit configured to model the effect of the plurality of flight parameters on a first coverage of the agricultural product. Based on the modeled effect, the control system may alter the flowrate of the plurality of disbursement nozzles to achieve a second coverage of the agricultural product.

Embodiments of the present disclosure may include an unmanned aerial vehicle. The unmanned aerial vehicle may include a drive system, a control system having a plurality of sensors for monitoring the navigation state of the unmanned aerial vehicle, and at least one disbursement mechanism operable to disburse an agricultural product in a spray pattern over an area. The navigation state may include vehicle longitudinal, lateral, and vertical velocities and accelerations, position and altitude, vehicle attitude angles and angular rates, wind speed and direction, among others. The navigation state can be written in vector form and may be estimated through filtering and weighting of a plurality of aircraft and navigation sensor data. An extended Kalman filter, for example, can filter aircraft navigation sensors to arrive at accurate and robust navigation state estimate(s). The disbursement mechanism(s) may have a variable flowrate. The control system may modulate the flowrate of the disbursement mechanism(s) to achieve substantial uniformity of the spray pattern based on data received from the plurality of sensors.

Embodiments of the present disclosure may include a method of dispersing a substance aerially over a defined space using an aerial vehicle having at least one disbursement mechanism. The method may include receiving at least one navigation parameter associated with the flight of the aerial vehicle, modeling a spray pattern of the disbursement mechanism(s) using the navigation parameter(s), and controlling a flowrate of the disbursement mechanism(s) to modulate the spray pattern of the disbursement mechanism(s) to achieve a desired uniformity or pattern.

Additional embodiments and features are set forth in part in the description that follows and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure. One of skill in the art will understand that each of the various aspects and features of the disclosure may advantageously be used separately in some instances, or in combination with other aspects and features of the disclosure in other instances.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments of the invention and illustrated in the accompanying drawings.

BRIEF DESCRIPTION OF THE DRAWINGS

The accompanying drawings, which are incorporated into and constitute a part of the specification, illustrate examples of the disclosure and, together with the general description above and the detailed description below, serve to explain the principles of these examples.

DETAILED DESCRIPTION

The present disclosure generally provides a disbursement system for a UAV that provides more uniform coverage of an agricultural product through the use of higher fidelity modeling and control of the variables that present non-uniform delivery in aerial spray applications. The disbursement system can be used in a variety of applications, for example, dispersing an agricultural product over a defined space, or the like. The disbursement system integrates a control system having a plurality of sensors operable to monitor a plurality of flight parameters (e.g., position and trajectory) to control the disbursement of the agricultural product. The disbursement system functions to achieve substantial uniformity of the agricultural product over the defined space by modulating the disbursement of the agricultural product based on in-flight data received from the plurality of sensors. Through use of disbursement system of the present disclosure, significant improvements of uniform coverage can be achieved over conventional disbursement mechanisms. Although described with reference to an agricultural product, it is contemplated that the disbursement system may dispense substantially any type of product or chemical, whether liquid, powder, or granular, including but not limited to weed killer, fertilizer, fire retardant, and any other agricultural or non-agricultural substance.

Figure 1:
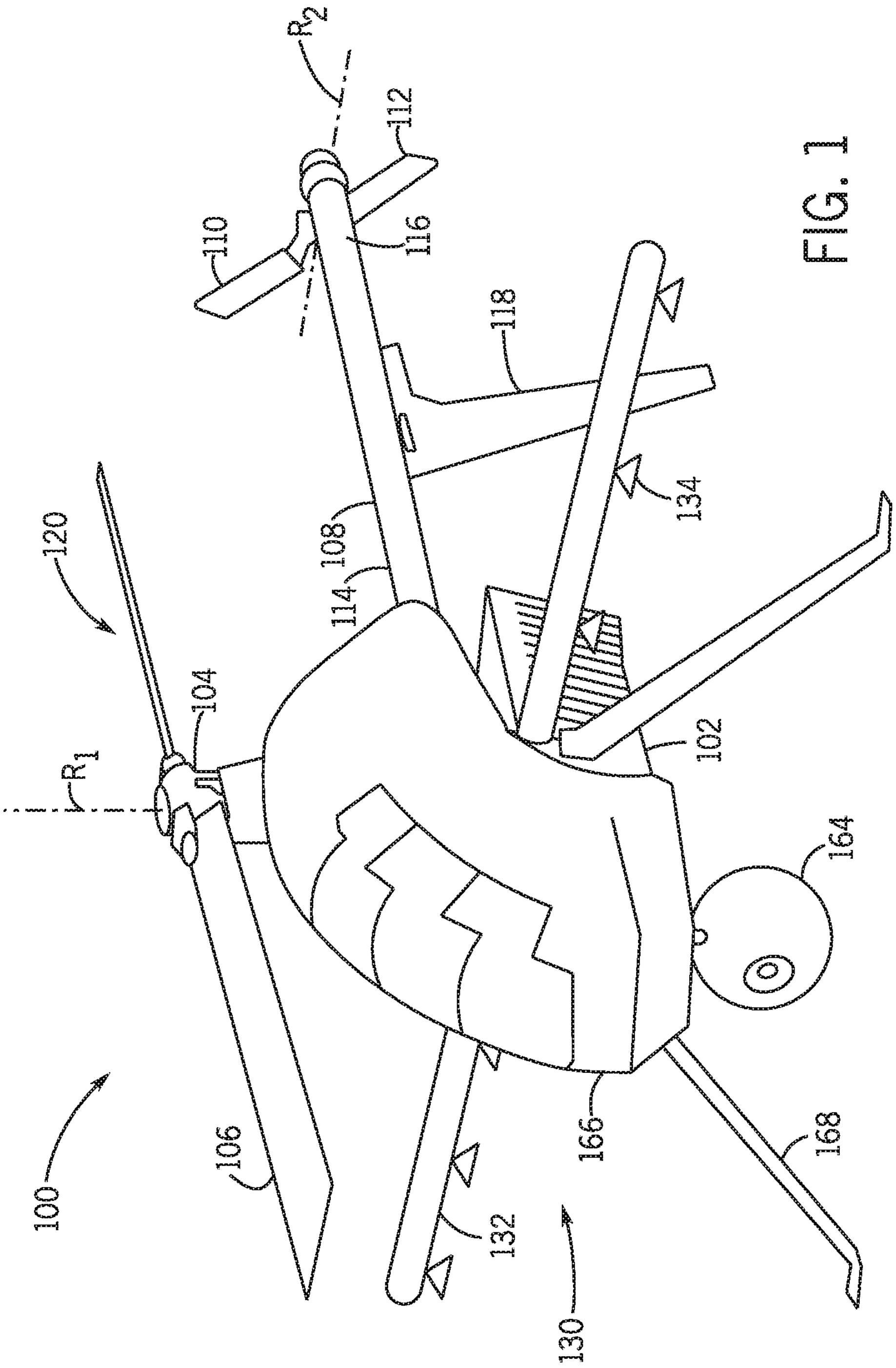
FIG. 1 is an isometric view of a helicopter UAV incorporating a disbursement system in accordance with an embodiment of the present disclosure.

Referring now to FIG. 1, a helicopter UAV 100 generally includes a frame structure 102 to which a main rotor assembly 104 having a plurality of main rotor blades 106 (e.g., two main rotor blades 106) is rotatably attached at a first rotational axis $R_1$. A tail boom 108 is connected to the frame structure 102 to locate a tail rotor assembly 110 having a plurality of tail rotor blades 112 (e.g., two tail rotor blades 112) a distance away from the first rotational axis $R_1$ of the main rotor assembly 104. For example, the tail boom 108 includes a proximal end 114 and a distal end 116. The proximal end 114 of the tail boom 108 is connected to the frame structure 102 (e.g., a rear portion of the frame structure 102) and the tail rotor assembly 110 is rotatably attached to the distal end 116 of the tail boom 108 at a second rotational axis $R_2$, which may be orthogonally positioned relative to the first rotational axis $R_1$. As shown in FIG. 1, the main rotor assembly 104 is horizontally-mounted to the UAV 100 to provide vertical lift upon rotation of the main rotor assembly 104 about the first rotational axis $R_1$. In addition to providing vertical lift, the main rotor assembly 104 may also provide pitching and rolling capability to the UAV 100.

The tail rotor assembly 110 is vertically-mounted to the distal end 116 of the tail boom 108 to provide horizontal thrust upon rotation of the tail rotor assembly 110 about the second rotational axis $R_2$. The horizontal thrust provided by the tail rotor assembly 110 controls the rotational position (i.e., yaw) of the UAV 100 by, for example, counteracting the torque created by rotation of the main rotor assembly 104. The tail boom 108 may include a vertical stabilizer 118 to prevent the tail rotor assembly 110 from touching a support surface (e.g., the ground) during landing or ground operation of the UAV 100. In some embodiments, the vertical stabilizer 118 may support the UAV 100 against the support surface during non-flight operation and/or storage. Additionally or alternatively, the vertical stabilizer 118 may help or otherwise allow the UAV 100 to "weathervane" into the direction of motion during flight.

In the illustrative embodiment of FIG. 1, the UAV 100 includes a drive system 120 to cause flight of the UAV 100. In a general sense, the drive system 120 includes a powertrain, the main rotor assembly 104, and the tail rotor assembly 110. The powertrain includes a motor (e.g., an electric motor) and a gearing assembly to respectively generate power and deliver it to the main rotor assembly 104 and/or the tail rotor assembly 110. The gearing assembly, which converts and/or translates the energy (e.g., rotation) of the motor into the rotation required to drive the main rotor assembly 104 and/or the tail rotor assembly 110, may include a set of meshingly engaged mechanical gearboxes and/or an electromagnetic transmission. Through the set of mechanical gearboxes and/or the electromagnetic transmission, the gearing assembly directs the power generated by the motor to both the main rotor assembly 104 and the tail rotor assembly 110. In some embodiments, however, the tail rotor assembly 110 may be driven by a secondary powertrain located substantially within the tail boom 108. In embodiments wherein the motor is an electric motor, the UAV 100 includes a power source (e.g., a battery pack) to power the motor during flight operation. The power source may be rechargeable through connection with DC and/or AC voltage sources. Additionally or alternatively, the power source may recharge through one or more solar panels connected to the UAV 100. In some embodiments, portions of the drive system 120 may be received within the frame structure 102 to conserve space and protect the individual components of the drive system 120.

In the exemplary embodiment of FIG. 1, the UAV 100 is equipped with a disbursement system 130 operable to disburse a flowable product or substance (e.g., an agricultural product) at variable flowrates, which may be measured in units per linear measurement. For example, the disbursement system 130 may include a spray rig 132 attached to the frame structure 102. As shown, the spray rig 132 may extend laterally from the frame structure 102 such that the spray rig 132 does not contact the support surface during non-flight operation or storage. To disperse the agricultural product, a plurality of disbursement nozzles 134 may be attached to the spray rig 132. In some embodiments, the agricultural product, which may be a liquid, a powder, or a granular substance, may be sprayed by the disbursement nozzles 134 as the UAV 100 traverses aerially over a defined space or spray area 136 (see FIG. 6, for instance). Each disbursement nozzle 134 may disburse the agricultural product in a constant or variable spray pattern or flow. As explained more fully below, the disbursement system 130, and more specifically the disbursement nozzles 134, may be modulated or controlled by a flow controller 138 (e.g., a variable rate pump system) to achieve substantial uniformity of coverage of the agricultural product over the defined space or spray area 136 (see FIG. 2). In some embodiments, the flow controller 138 may be responsive to instructions and may be operable to regulate a volume of the agricultural product dispensed by the disbursement system 130 (e.g., the disbursement nozzles 134). Although described with reference to disbursement nozzles 134, substantially any type of disbursement mechanism is contemplated.

Figure 2:
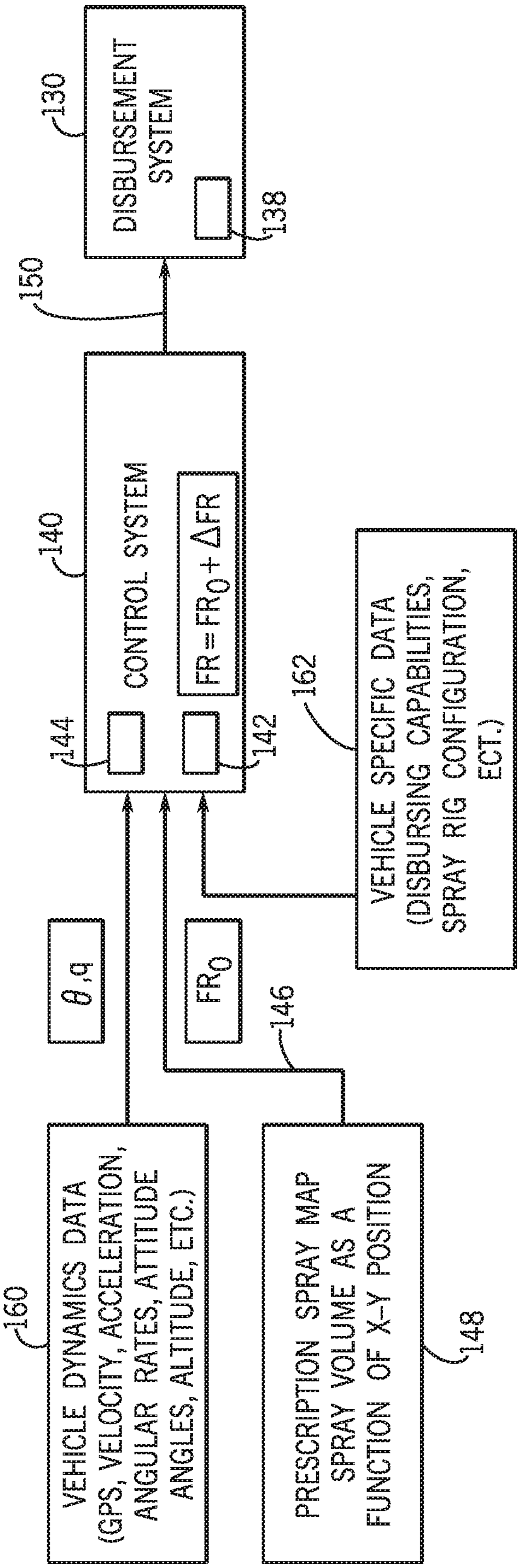
FIG. 2 is a flowchart of a process of augmenting a flowrate of a disbursement system in accordance with an embodiment of the present disclosure.

With reference to FIG. 2, the UAV 100 may be equipped with a control system 140 to both monitor flight parameters and ambient conditions and control the disbursement system 130 during at least in-flight operation. The control system 140 of one exemplary embodiment includes a processing unit 142, and a plurality of sensors 144 for monitoring position, trajectory, and other flight parameters of the UAV 100. For example, the sensors 144 may monitor aircraft position and velocity as well as other measurable and inertial navigation parameters to provide augmentation to the disbursement system 130. These can include roll, pitch, and yaw (i.e., attitude angles $\varphi$, $\theta$, $\psi$); linear accelerations in each of the orthogonal axes (i.e., $a_x$, $a_y$, $a_z$); angular accelerations about each of the orthogonal axes (i.e., $\omega_x$, $\omega_y$, $\omega_z$); disc loading/weight (i.e., DL); and other aircraft state estimation variables. In some embodiments, the sensors 144 may monitor aircraft altitude, wind vectors, and/or acceleration of the main rotor assembly 104 to account for at least rotor wash created by the UAV 100 within flow control instructions, as detailed below.

In some embodiments, the data received by each of the sensors 144 may be passed to the processing unit 142 to calculate the necessary flowrate output from the disbursement system 130 based upon a mathematical function modeled for the UAV 100. For example, the processing unit 142 may model an effect of the monitored flight parameters on first flow control instructions 146 corresponding to a prescription coverage 148 of the agricultural product and calculate and output modulated flow control instructions 150 to the disbursement system 130 (e.g., the flow controller 138). Based on the modeled effect, the control system 140 may alter or otherwise modulate the first flow control instructions 146 to change the flowrate of one or more of the disbursement nozzles 134, either collectively or individually, to achieve an actual coverage of the agricultural product that is closer to the prescription coverage 148 than would have been achieved without the modulated flow control instructions 150. As such, in some embodiments, the actual coverage is more uniform compared to a prospective coverage resulting from the first flow control instructions 146. In this manner, the control system 140 is capable to modulate the flowrate of the disbursement system 130 to achieve substantial uniformity of coverage based on real-time data received from the sensors 144. The control system 140 can be implemented using standardized control methodologies including dynamic inversion, classical feedback control, and/or more advanced modern control formulations by driving spray errors to approach zero based upon the prescription coverage 148 or spray map that is normalized for the particular topography of the area to be sprayed. In some embodiments, augmentation of the flowrate may achieve a substantially uniform application of the agricultural product per linear measurement of the area over which the agricultural product is being dispersed.

One method to modulate the flowrate of the disbursement system 130 is schematically shown in FIG. 2. As shown, the prescription coverage 148 that is normalized for the particular topography of the spray area 136 to be sprayed is passed to the control system 140 (e.g., the processing unit 142). The prescription coverage 148 provides a flowrate baseline as a function of horizontal position (i.e., x-y position) of the UAV 100. In the embodiment of FIG. 2, the prescription coverage 148 is not vehicle specific nor does it account for ambient conditions or vehicle dynamics. As illustrated, a vehicle dynamics module 160 is configured to pass the aircraft navigation parameters such as position, velocity, acceleration, angular acceleration, attitude angles, and altitude monitored by the plurality of sensors 144 of the control system 140 to the processing unit 142 for further processing therein. In some embodiments, a vehicle configuration module 162 provides vehicle specific data (e.g., number of disbursement nozzles 134, size and position of spray rig 132, and/or disbursing capabilities of the disbursement system 130) to the processing unit 142.

Using the above information, the processing unit 142 both models the effects of the navigation and vehicle specific parameters on the spray pattern and calculates a resultant flowrate using the equation $FR=FR_0+\Delta FR$, where $FR_0$ represents the baseline flowrate from the prescription coverage 148, ΔFR represents the change in flowrate needed as a result of the vehicle dynamics and vehicle specifics to achieve a uniform spray pattern, and FR represents the resultant flowrate to be dispersed by the disbursement system 130. In some embodiments, the change in flowrate ΔFR may be calculated using a single series equation, such as $$\Delta FR=K_{Ax}Ax+K_{Ay}Ay+K_{Az}Az+K_{\varphi}\varphi+K_{\theta}\theta+K_{\psi}\psi+K_{DL}DL+K_x x+K_y y+K_z z\ \ldots$$

This model can increase in fidelity by introducing more modeled effects and their respective parameter measurements. In the equations above, the respective constants (e.g., $K_{Ax}$, $K_{Ay}$, etc.) represent the amount of change in flow rate due to influence of the parameter denoted by the parameter's subscript. For example, $K_{Ay}$ represents the change in flowrate due to lateral acceleration of the vehicle (Ay) required by the disbursement system 130 (e.g., the flow controller 138) to achieve the prescribed flowrate on the spray area 136 to be treated. In some embodiments, these constants may be the first derivative of the flowrate with respect to the subscript parameter denoted. The form and value of the constants can be determined through theoretical and physical formulation, through test data regression and statistical methods, and in some cases, their value does not need to be determined, but rather the determination that an effect is present that can be controlled using simple controllers with feedback from an available parameter in the state estimate. In this usage, "simple" is defined as a dynamic system that can be effectively controlled using controllers that can be reasonably hand-tuned through trial and error.

As shown in FIG. 2, after calculating the flowrate FR to be dispensed by the disbursement system 130, the control system 140 (e.g., the processing unit 142) controls the disbursement system 130 (e.g., the flow controller 138, which may be a variable rate flow control pump) to match the required flowrate FR. Control is provided through communication between the control system 140 (e.g., the processing unit 142) and a pump or other liquid or granular disbursement mechanism that is calibrated for a certain range of flowrates. Common electronics communication strategies can be used to communicate between the processing unit 142 and the disbursement mechanism to include serial digital communication, analog communication, pulse width modulation communication, among others. Full duplex communications, such as that provided by RS 422 or RS 485 physical layers, can be useful when feedback from the pump(s) is desired. For instance, in an example where individual nozzle control is achieved through the modulation of individual pumps for each disbursement nozzle 134. In such embodiments, full duplex and single bus communications may be desired to reduce wire weight and complexity by controlling all pumps and/or disbursement nozzles 134, while simultaneously receiving sensor data on a single communication cable.

Figure 3:
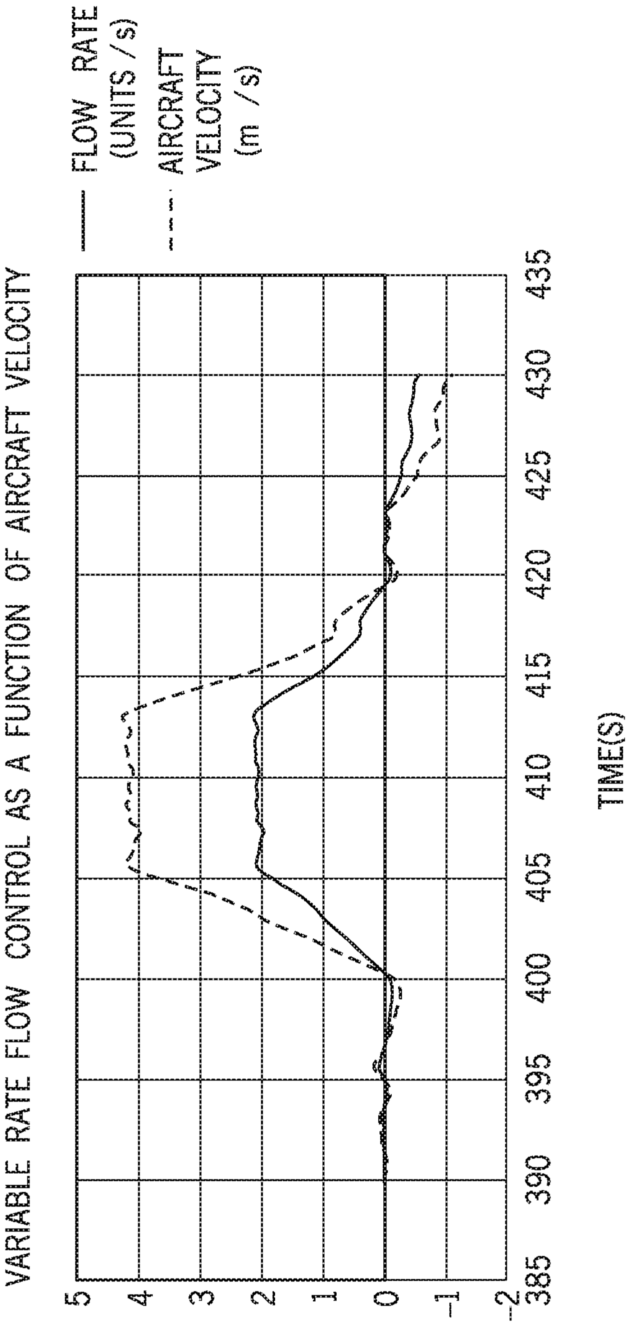
FIG. 3 is a graphical representation of variably augmenting a flowrate of a disbursement system as a function of aircraft velocity in accordance with an embodiment of the present disclosure.

With reference to FIG. 3, the control system 140 may account for flight parameters, as noted above, in calculating the required flowrate FR necessary to achieve substantial uniformity in coverage of the agricultural product over the area to be sprayed. For example, to achieve uniformity in coverage, the control system 140 may selectively vary the output of the disbursement system 130 (e.g., the flow controller 138) based on, for instance, aircraft velocity. Without accounting for aircraft velocity, non-uniformity in coverage may be present due to variations in the velocity of the UAV 100. As shown in FIG. 3, as the velocity of the UAV 100 increases, the control system 140 may increase the flowrate FR of the disbursement system 130 to account for the increased surface area covered per measurement of time. In like manner, as the velocity of the UAV 100 decreases, the control system 140 may correspondingly decrease the flowrate FR of the disbursement system 130 as less surface area is covered per measurement of time.

In some embodiments, the control system 140 may account for environmental parameters, such as prevailing wind conditions. For example, a tailwind may produce a spray pattern corresponding to a higher velocity of the UAV 100. Similarly, a headwind may produce a spray pattern corresponding to a lower velocity of the UAV 100. To account for such errors, the control system 140 may calculate a net velocity of the UAV 100 based on both the velocity of the UAV 100 and the environmental parameters.

Figure 4:
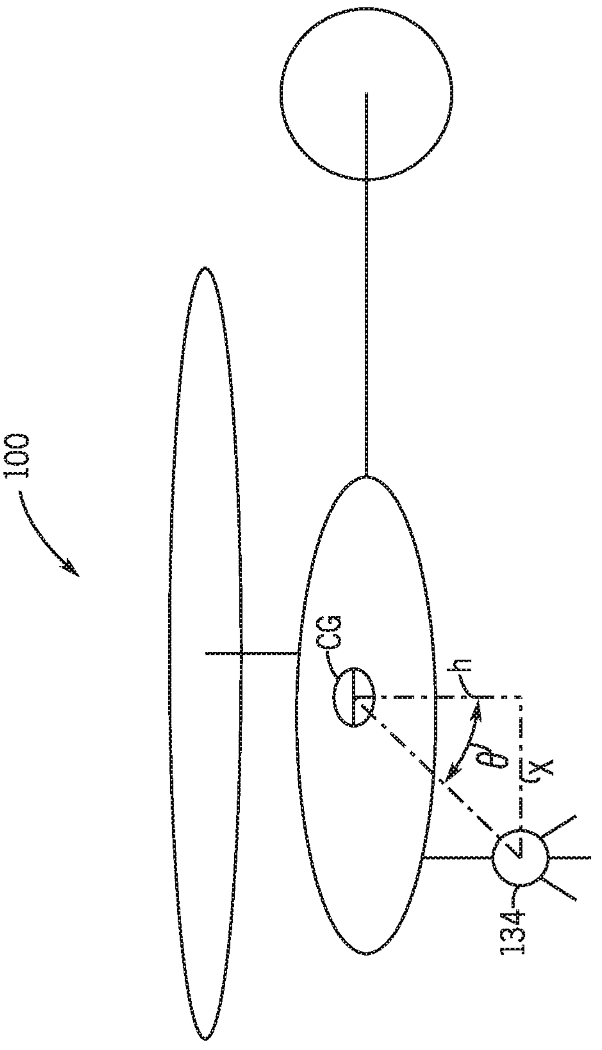
FIG. 4 is a representative view of a UAV with inherent uniformity errors due to pitching dynamics in accordance with an embodiment of the present disclosure.

With reference to FIG. 4, in some embodiments, the control system 140 may account for vehicle specific data, as noted above, in calculating the required flowrate FR. For example, in the embodiment of FIG. 4, the disbursement nozzles 134 are located forward and below the center of gravity CG of the UAV 100. Without accounting for the position of the disbursement nozzles 134 relative to the center of gravity CG of the UAV 100, non-uniformity in coverage may be present due to at least pitching dynamics of the UAV 100 during flight. As shown, the lateral distance X between the center of gravity CG and the disbursement nozzles 134 can be calculated using the equation $X=h\cdot\text{Tan }\theta$, where h is the vertical boom offset, and e is the pitch angle of the UAV 100 relative to the ground. The rate of change of X resulting from the change in pitch angle θ (i.e. X') can be found by differentiating this relationship, thus: $X'=h\cdot(1/\text{Cos }\theta)^2\cdot q$, where q is equal to the first derivative of pitch angle θ, or pitch rate.

The pitch rate q may be negative during controlled acceleration, up-righting, and/or the second phase of braking of the UAV 100. The pitch rate q may be positive during the end of acceleration or during an initial braking phase of the UAV 100. In some embodiments, the pitch rate q can be measured directly with a rate gyro associated with the UAV 100. Additionally or alternatively, both the pitch angle θ and the pitch rate q may be outputs measured directly from a flight control system 140 of the UAV 100. In this example, X' is directly related to non-uniformity of coverage as a result of pitching dynamics. This non-uniformity can be removed or reduced by augmenting the resulting flowrate FR using the equation $\Delta FR=K\cdot h\cdot(1/\text{Cos }\theta)^2\cdot q$, where K is a proportional gain, or pitch augmentation, that can be used to reduce or increase the amount of actuation required from the flow control pump with respect to this error.

Figure 5:
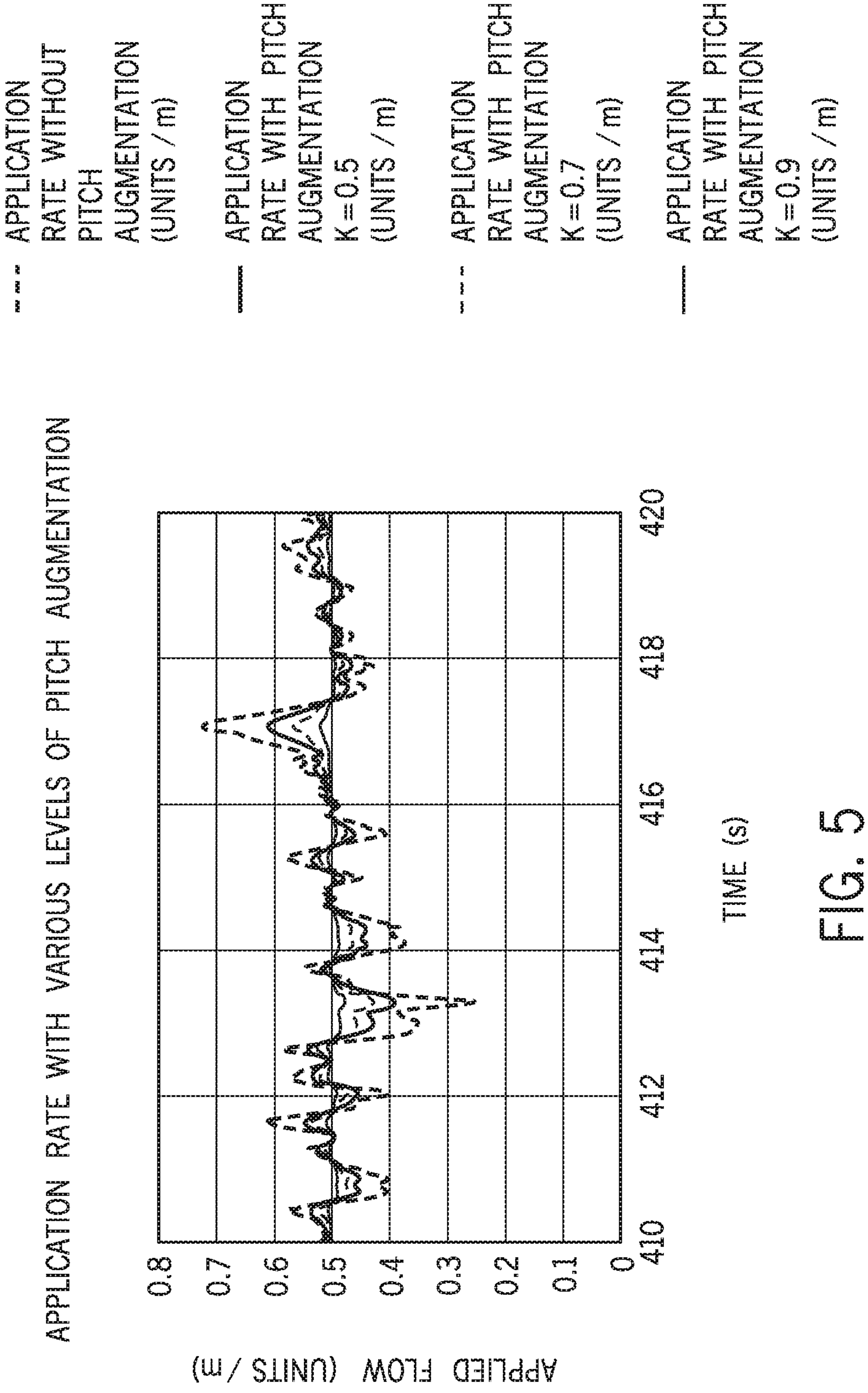
FIG. 5 is a graphical representation of application rates with various levels of pitch augmentation in accordance with an embodiment of the present disclosure.

With reference to FIG. 5, the application rate of the agricultural product dispensed by the disbursement system 130 (i.e., the amount of agricultural product actually applied per linear measurement) may vary depending on the pitch augmentation K used to account for non-uniformity of coverage as a result of pitching dynamics. As shown in FIG. 5, different levels of pitch augmentation K causes the application rate to change from highly variable to relatively uniform. For example, the application rate of the agricultural product without any pitch augmentation K is highly variable and non-uniform, whereas higher levels of pitch augmentation K increase the sensitivity of the disbursement system 130 to account for pitch dynamics. As shown, low levels of pitch augmentation K result in non-uniformity in the application of the agricultural product as the pitch angle θ of the UAV 100 varies during application of the agricultural product. On the other hand, sufficiently high pitch augmentation K can lead to a relatively constant application rate of the agricultural product for the same variation in pitch angle θ.

Figure 6:
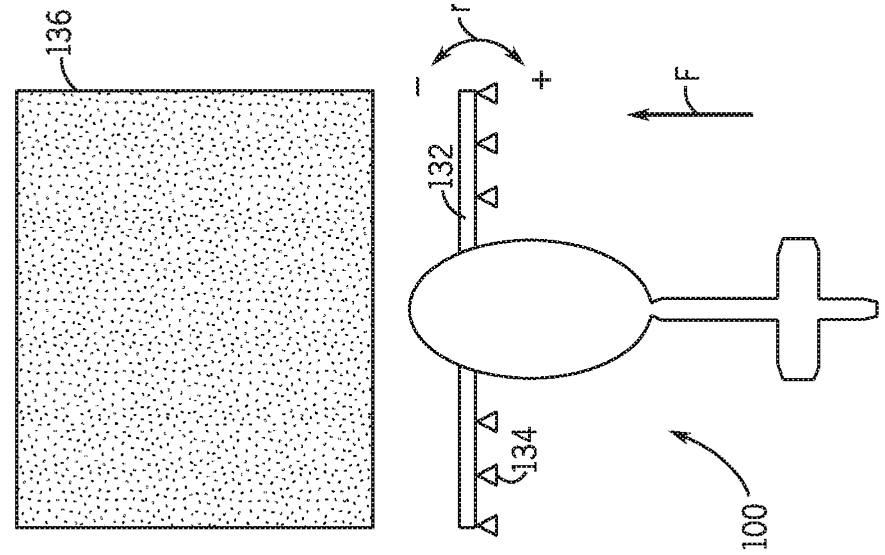
FIG. 6 is a representative view of a UAV with inherent uniformity errors due to yaw dynamics in accordance with an embodiment of the present disclosure.
Figure 6B:
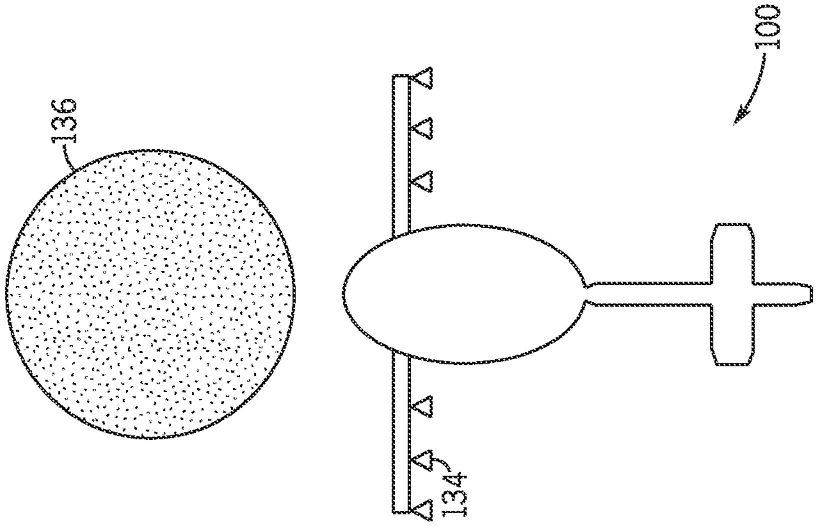
FIG. 6B is a representative view of a UAV with inherent uniformity errors due to non-rectilinear spray areas in accordance with an embodiment of the present disclosure.
Figure 6A:
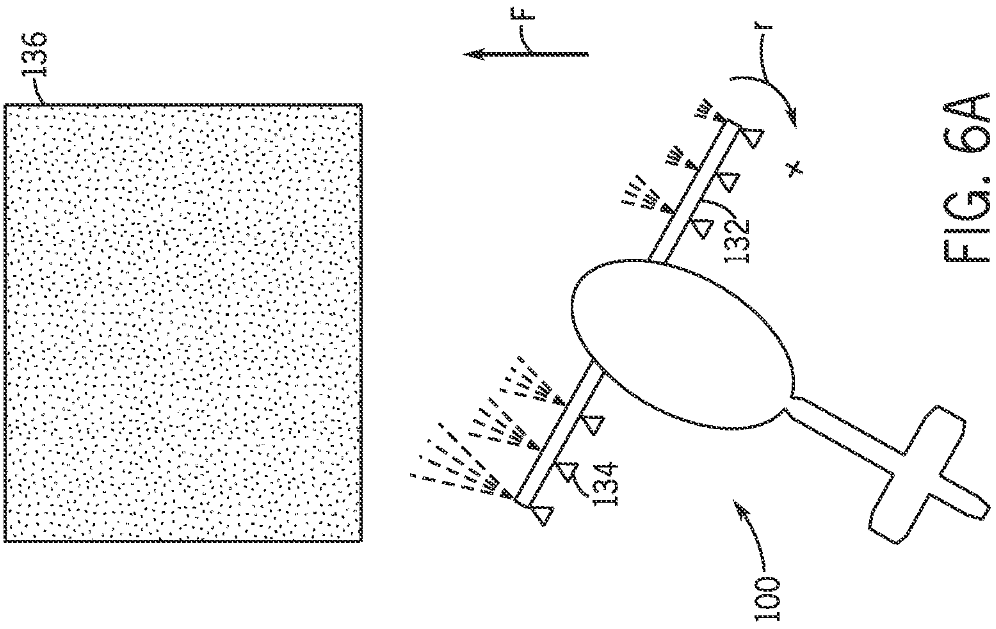
FIG. 6A is a representative view of a UAV with a positive yaw disturbance in accordance with an embodiment of the present disclosure.

With reference to FIGS. 6 and 6A, the control system 140 may account for yaw dynamics of the UAV 100 during in-flight operation. For example, the yaw rate r of the UAV 100 (i.e., the rate of change of heading angle) can be used to augment flow of the disbursement system 130. In the example of FIG. 6, the spray area 136 is rectangular, although the principles described may apply equally to other geometric shapes and a spherical volume, such as a tree, that is to be uniformly sprayed. As shown in FIG. 6, as the UAV 100 passes over the spray area 136, a positive or negative yaw rate or disturbance r may be applied to the UAV 100 by, for example, wind disturbances imparted to the UAV 100. For example, a positive yaw rate r may be applied to the UAV 100 such that the right side of the spray rig 132 swings aft and the left side of the spray rig 132 swings forward with respect to the flight direction F (see FIG. 6A). In such embodiments, without the augmentation described herein, the right side of the spray area 136 would receive an abundance of agricultural product over that which was prescribed, and the left side of the spray area 136 would receive less agricultural product than was prescribed, thus resulting in a non-uniform coverage of the spray area 136. As explained below, individual disbursement nozzles 134 may be controlled at differing rates to achieve uniform coverage without spraying areas outside the spray area 136 itself.

In the exemplary embodiment of FIG. 6A, a positive yaw disturbance r causes the left side of the spray area 136 to be increasingly undersprayed, the increasingly undersprayed portion getting larger the further away from a center of the spray rig 132. Similarly, the right side of the spray area 136 receives too much agricultural product, more so at the extents of the spray rig 132 than towards the center. In such embodiments, the control system 140 may calculate and output modulated flow control instructions 150 that individually control each disbursement nozzle 134 to account for yaw disturbance r of the UAV 100. For instance, in the positive yaw disturbance example shown in FIG. 6A, the control system 140 may augment the disbursement system 130 such that the flow controller 138 causes the disbursement nozzles 134 to flow at decreasing rates from the left side of the spray rig 132 to the right side of the spray rig 132 to create a uniform spray pattern in the presence of a positive yaw disturbance r. The rate of change of the individual flowrates of the disbursement nozzles 134 from left to right may vary depending on the degree of positive yaw disturbance r. For example, a sufficiently high yaw disturbance r may cause the rate of change of individual flowrates across the spray rig 132 to be relatively steep or large. On the other hand, a relatively small yaw disturbance r may cause the rate of change of individual flowrates across the spray rig 132 to be flat or small.

With reference to FIG. 6B, the control system 140 may be operable to augment the disbursement nozzles 134, either collectively or individually, to efficiently place or distribute the agricultural product over a non-rectilinear spray area 136, thus resulting in significantly more uniform coverage of the agricultural product over the spray area 136. For example, each of the disbursement nozzles 134 may be individually controlled, such as by the modulated flow control instructions 150, to alter the flowrate FR to achieve more accurate placement or distribution of the agricultural product over and/or within a circular spray area 136. As the UAV 100 approaches the circular spray area 136 of FIG. 6B, the control system 140 may allow the innermost disbursement nozzles 134 to flow first. As the UAV 100 continues to pass over the spray area 136, the control system 140 may turn on outer disbursement nozzles 134 in a cascading fashion such that the entire spray area 136 can be covered without unnecessarily turning on the disbursement nozzles 134 too early. Similarly, as the UAV 100 finishes passing over the spray area 136, the control system 140 may turn off the disbursement nozzles 134 in a cascading fashion from outermost disbursement nozzle 134 to innermost disbursement nozzle 134. In the embodiment of FIG. 6B, the control system 140 may additionally account for other sources of uniformity errors, such as yaw and pitch dynamics, as explained above, and roll dynamics, as explained below.

As noted above, the principles described herein may apply equally to non-flat surface anomalies, such as a mound or gulley, that is to be uniformly sprayed. In such embodiments, the non-flat surface anomalies can be parameterized and accounted for to modulate the flowrate FR. For example, in embodiments wherein the UAV 100 passes over a mound, the control system 140 may account for the increased surface area of the mound such that the disbursement system 130 automatically applies more agricultural product to compensate for the additional surface area. In like fashion, the control system 140 may modulate the flowrate FR of the disbursement system 130 to account for undulating terrain as well as other non-flat surface anomalies such as trees.

Figure 7:
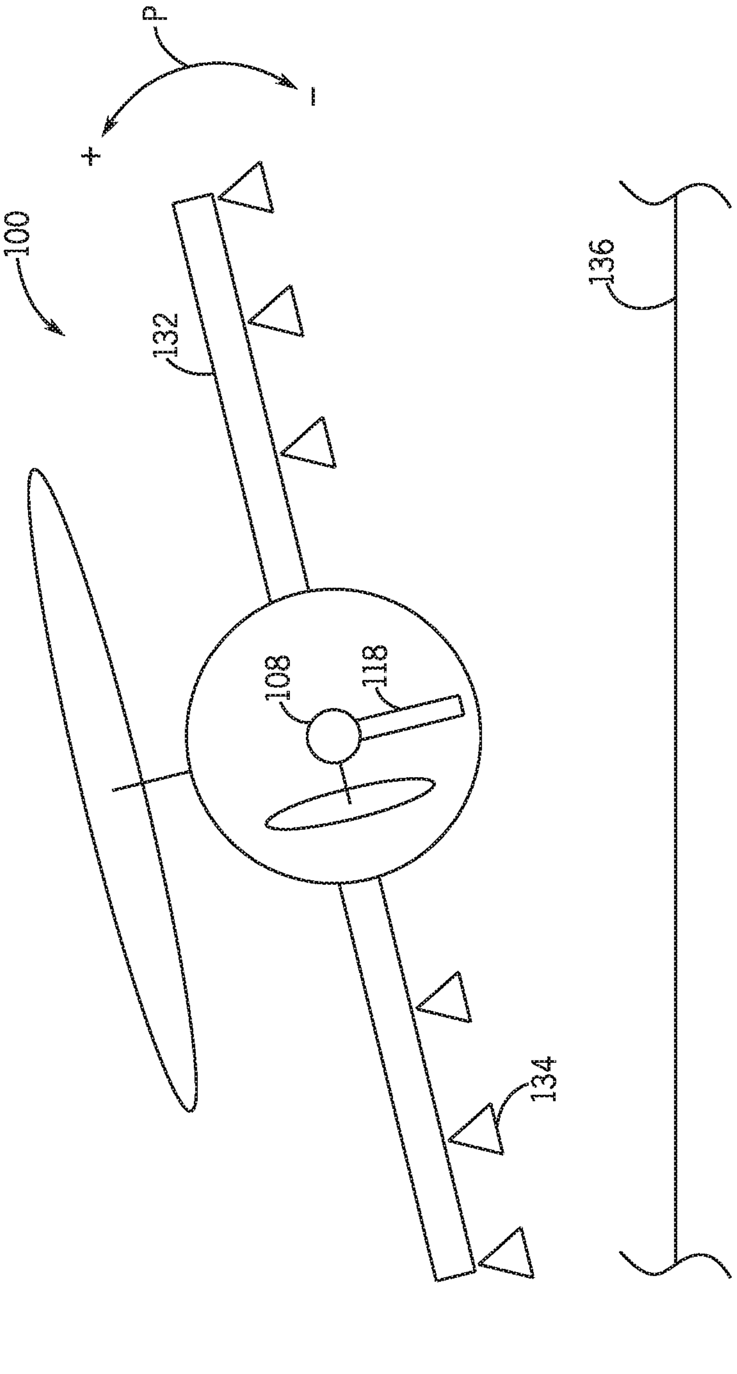
FIG. 7 is a representative view of a UAV with inherent uniformity errors due to roll dynamics in accordance with an embodiment of the present disclosure.

With reference to FIG. 7, the control system 140 may account for roll dynamics of the UAV 100 during in-flight operation. For example, the roll rate p of the UAV 100 (i.e., the rate of change of the UAV 100 about its longitudinal axis) can be used to modulate flow of the disbursement system 130. As shown in FIG. 7, as the UAV 100 passes over the spray area 136, a positive or negative roll rate p may be applied to the UAV 100 by, for example, undulating terrain or wind disturbances applying lateral forces to the vertical stabilizer 118 to cause the UAV 100 to rotate about the tail boom 108. A positive roll rate p may be applied to the UAV 100 such that the right side of the spray rig 132 swings up and the left side of the spray rig 132 swings down with respect to a horizontal plane parallel to the spray area 136. Without accounting for roll dynamics, one side of the spray area 136 may receive more agricultural product than was prescribed, thus resulting in a non-uniform coverage of the spray area 136. In such embodiments, the control system 140 may augment the disbursement system 130 such that the disbursement nozzles 134 flow at decreasing rates to create a uniform spray pattern in the presence of the roll disturbance p.

The present disclosure has broad application. For example, using the broad concepts discussed above, the control system 140 may augment the disbursement system 130 based on the rotor speed of the main rotor assembly 104 and/or the tail rotor assembly 110. In such embodiments, the airflow created by the main rotor assembly 104 and/or the tail rotor assembly 110 can be modeled and used to quantify the flight dynamics effect on how the agricultural product is carried to the ground (i.e., the resultant trajectory of the agricultural product). For example, a positive pitch angle θ may propel the agricultural product forward a greater amount due to the airflow created by the main rotor assembly 104. Similarly, airflow disturbance caused by the tail rotor assembly 110 may propel the agricultural product laterally away from the UAV 100, all other variables being constant. By using the concepts disclosed herein, augmentation of the disbursement system 130 by the control system 140 can be utilized to cancel such effects. Furthermore, even if flow is unaugmented, the concepts disclosed herein can be used to collect and record data required to analyze and model "as applied" coverage as compared to "as prescribed" coverage. For example, if it were known that because the UAV 100 rolled to a bank angle of 9 degrees for a 1.2 second period without accelerating in any axis, and the effective change in flowrate at a point that is to have zero spray was negative, then the indication is that too much product will land on an area that is to be unsprayed. An operator can then be warned, or the system can be programmed to control the disbursement system 130 automatically to an off-state so as not to disburse product that is predicted to land in a forbidden area. In some embodiments, the combined flowrate and aircraft navigation and sensor data can also be utilized for recordkeeping and evidence of "as applied" disbursement.

In some embodiments, the terrain over which the agricultural product is to be sprayed can be modeled from photography, ground samples, color, temperature, or any other surface parameter. Sensing of the terrain can take place before application of the agricultural product or can occur simultaneously with product application. In some embodiments, the UAV 100 may model the terrain using accessory equipment 164 attached to the UAV 100 (e.g., through a Nadir mounted DSLR high resolution camera and/or a fully stabilized camera gimbal having electro-optical and/or infrared sensors) (see FIG. 1). In addition to providing modeling capability of terrain, the accessory equipment 164 may provide other aviation uses, including, for example, aerial surveillance, inspection, surveying, 3D mapping, photography, and filmmaking. The examples given above, however, are not limiting, and it is contemplated that substantially any type of accessory may be attached to the UAV 100.

With reference to FIG. 1, the UAV 100 may include additional components to improve the functionality and capabilities of the UAV 100. For example, the UAV 100 may include a canopy 166 attached to the frame structure 102 to improve both the aesthetic and aerodynamic characteristics of the UAV 100. In an exemplary embodiment, the canopy 166 hides or otherwise conceals the internal components of the UAV 100. To aid in landing, the UAV 100 may include landing gear 168 to support the UAV 100 during non-flight operation or storage. The landing gear 168, which may include planar or tubular landing skids, is attached to the frame structure 102 (e.g., to opposing sides of the frame structure 102). During non-flight operation or storage, the landing skids may be the only portion of the UAV 100 touching the support surface, or alternatively support the UAV 100 in a tripod-like manner with the vertical stabilizer 118.

In some embodiments, the UAV 100 may be equipped with communication equipment. For example, the UAV 100 may be controlled by a hand-held remote control unit or ground station. In other embodiments, the UAV 100 may include an automatic flight control system capable of precise navigation, guidance, and control of the UAV 100 without user intervention. In some embodiments, the UAV 100 may transfer data to, or receive data from, a user, a ground station, and/or other UAV 100*s* through Wi-Fi, cellular data, mobile satellite communications, radio frequency, infrared or ultrasonic remote control devices, or any other wireless data communication mediums.

The foregoing description has broad application. Accordingly, the discussion of any embodiment is meant only to be explanatory and is not intended to suggest that the scope of the disclosure, including the claims, is limited to these examples. In other words, while illustrative embodiments of the disclosure have been described in detail herein, the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

All directional references (e.g., distal, upper, lower, upward, left, right, lateral, front, back, top, bottom, outer, inner, below) are only used for identification purposes to aid the reader's understanding of the present disclosure and drawings and not as limitations. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., first, second, etc.) are not intended to connote importance or priority, but are used to distinguish one feature from another. The drawings are for purposes of illustration only and the dimensions, positions, order and relative sizes reflected in the drawings attached hereto may vary.

What is claimed is:

1. A disbursement system for an unmanned aerial vehicle, the disbursement system comprising a plurality of disbursement nozzles operable to dispense a flowable product at variable flowrates;

a flow controller responsive to instructions and operable to regulate a volume of the flowable product dispensed by the plurality of disbursement nozzles by changing the flowrate of one or more of the disbursement nozzles, either collectively or individually; and a control system including a plurality of sensors operable to monitor a plurality of flight parameters, including an attitude angle and at least one of a roll angle $\varphi$, a pitch angle $\theta$, and a yaw angle $\psi$ of the unmanned aerial vehicle; and a processing unit configured to model an effect of the plurality of flight parameters on first flow control instructions corresponding to a prescription coverage of the product and calculate and output modulated flow control instructions to the flow controller, wherein based on the modeled effect, the control system modulates the first control instructions to change a flowrate of one or more of the plurality of disbursement nozzles to achieve an actual coverage of the product that is closer to the prescription coverage than would have been achieved without the modulated flow control instructions.

2. The disbursement system of claim 1, wherein the actual coverage is more uniform compared to a prospective coverage resulting from the first flow control instructions.

3. The disbursement system of claim 1, wherein the modulated flow control instructions vary the flowrates of the plurality of disbursement nozzles to achieve more accurate distribution of the product.

4. The disbursement system of claim 1, wherein the product is sprayed by the plurality of disbursement nozzles.

5. The disbursement system of claim 1, wherein the product is a liquid, a powder, or a granular substance.

6. The disbursement system of claim 1, wherein the plurality of sensors monitors one or more of an attitude angular rate including at least one of a roll rate p, pitch a rate q, and a yaw rate r, linear acceleration ($a_x$, $a_y$, $a_z$), and angular acceleration ($\omega_x$, $\omega_y$, $\omega_z$), of the unmanned aerial vehicle.

7. The disbursement system of claim 6, wherein the plurality of sensors monitors one or more of altitude, wind vectors, and acceleration or speed and control settings of a main rotor assembly of the unmanned aerial vehicle.

8. The disbursement system of claim 7, wherein the plurality of sensors monitors one or more of acceleration or speed and control settings of a tail rotor assembly of the unmanned aerial vehicle.

9. The disbursement system of claim 1, wherein the first flow control instructions are modeled based on rotor wash of the unmanned aerial vehicle.

10. The disbursement system of claim 1, wherein the modulated flow control instructions control the flowrates of the plurality of disbursement nozzles individually.

11. An unmanned aerial vehicle comprising a drive system to cause flight of the unmanned aerial vehicle;

a control system having a plurality of sensors for monitoring flight position, trajectory, and an attitude angle including at least one of a roll angle $\varphi$, a pitch angle $\theta$, and a yaw angle $\psi$ of the unmanned aerial vehicle; and at least one disbursement mechanism operable to disburse an agricultural product in a spray pattern over an area, the at least one disbursement mechanism having a flowrate, wherein the control system models a spray pattern of the at least one disbursement mechanism based on data received from the plurality of sensors, and, according to the model, modulates the flowrate of the at least one disbursement mechanism to achieve substantial uniformity of the spray pattern.

12. The unmanned aerial vehicle of claim 11, wherein the plurality of sensors monitor one or more of an attitude angular rate including at least one of a roll rate p, a pitch rate q, and a yaw rate r, and linear acceleration ($a_z$, $a_y$, $a_z$), of the unmanned aerial vehicle.

13. The unmanned aerial vehicle of claim 12, wherein the plurality of sensors monitors one or more of position, velocity, and acceleration of the drive system.

14. The unmanned aerial vehicle of claim 11, wherein modulation of the flowrate of the at least one disbursement mechanism achieves a substantially uniform application of the agricultural product per linear measurement of the area.

15. A method of dispersing a substance aerially over a spray area using an unmanned aerial vehicle having at least one disbursement mechanism, the method comprising receiving a plurality of navigation parameters including at least one of a roll angle φ, a pitch angle θ, and a yaw angle ψ of the unmanned aerial vehicle associated with a flight of the unmanned aerial vehicle;

modeling a spray pattern of the at least one disbursement mechanism using the plurality of navigation parameters; and controlling a flowrate of the at least one disbursement mechanism to modulate the spray pattern of the at least one disbursement mechanism according to the model to achieve a desired uniformity or pattern.

16. The method of claim 15, wherein the modeling step includes using one or more of an attitude angular rate including at least one of a roll rate p, a pitch rate q, and a yaw rate r, linear acceleration ($a_x$, $a_y$, $a_z$), and angular accelerations ($\omega_x$, $\omega_y$, $\omega_z$), of the unmanned aerial vehicle.

17. The method of claim 16, wherein the modeling step includes using rotor speed to account for rotor wash from a main rotor blade of the unmanned aerial vehicle.

18. The method of claim 15, wherein controlling the flowrate augments a level of uniformity of the spray pattern of the at least one disbursement mechanism.

19. The method of claim 15, further comprising modeling a trajectory of the substance from the unmanned aerial vehicle to a ground surface.

20. The method of claim 15, further comprising modeling the spray pattern of the at least one disbursement mechanism using terrain data to account for a topography of the spray area.

* * * * *